United States Patent [19]

Zanuccoli

[11] Patent Number: 5,599,373
[45] Date of Patent: Feb. 4, 1997

[54] SULFUR-BASED CHEMICAL SOIL-CORRECTIVE IN THE FORM OF PELLETS FOR AGRICULTURAL USE

[75] Inventor: Pietro Zanuccoli, Catania, Italy

[73] Assignee: F.P.S.- Finances Products Services, S.r.l., Catania, Italy

[21] Appl. No.: 327,969

[22] Filed: Oct. 24, 1994

Related U.S. Application Data

[63] Continuation-in-part of Ser. No. 659,290, filed as PCT/IT89/00063, Sep. 19, 1989, abandoned.

[30] Foreign Application Priority Data

Sep. 30, 1988 [IT] Italy .................. 48406-A/88

[51] Int. Cl.$^6$ ..................... C05F 3/00
[52] U.S. Cl. ............... 71/21; 71/31; 71/64.05; 23/293 S; 424/705; 424/713; 424/714; 424/489
[58] Field of Search ................ 424/489, 703, 424/705, 704, 709, 714, 489, 499, 405, 408; 514/973; 71/DIG. 1, 21, 31, 64.05; 23/293 S, 313 R

[56] References Cited

U.S. PATENT DOCUMENTS

| | | | |
|---|---|---|---|
| 2,019,443 | 10/1935 | Christmann et al. | 424/714 |
| 2,156,790 | 5/1939 | Missbach | 424/704 |
| 2,992,090 | 7/1961 | Littler | 71/2.5 |
| 3,062,637 | 11/1962 | Marples et al. | 106/309 |
| 4,033,746 | 7/1977 | Young | 71/30 |
| 4,062,694 | 12/1977 | Sawyer | 106/309 |
| 4,153,764 | 5/1979 | Blount | 521/155 |
| 4,231,780 | 11/1980 | Collins | 71/40 |
| 4,564,639 | 1/1986 | Nagase et al. | 514/594 |

FOREIGN PATENT DOCUMENTS

0440676B1  1/1994  European Pat. Off. .

*Primary Examiner*—Neil S. Levy
*Attorney, Agent, or Firm*—Fildes & Outland, P.C.

[57] ABSTRACT

A sulfur-based, chemical soil-corrective or conditioner for agricultural use in the form of pellets, said product containing fly sulfur powder, at least 3% by weight of an inert compound selected from the group consisting of clay, bentonite, kaolin and mixtures thereof, and at least 0.5% by weight of a wetting agent; said components are mixed with one another, then subjected to wet extrusion and next to drying, so as to obtain mechanically strong pellets which are porous and suitable to be very easily disgregated when they are in contact with soil moisture.

14 Claims, No Drawings

SULFUR-BASED CHEMICAL SOIL-CORRECTIVE IN THE FORM OF PELLETS FOR AGRICULTURAL USE

CROSS REFERENCE TO RELATED APPLICATION

This application is a continuation-in-part of U.S. application Ser. No. 07/659,290 now abandoned filed Apr. 20, 1992, which is the national phase of PCT Application PCT/IT89/00063 filed Sep. 19, 1989, now European Patent Specification 0 440 676 B1 published Jan. 5, 1994, claiming priority of Italian Patent Application No. 48406-A/88 filed Sep. 30, 1988.

Description

This invention relates to a sulfur-based chemical soil-corrective for agricultural use, said product being in the form of pellets. More particularly this invention relates to a pelletized sulfur-containing chemical soil-corrective or soil-conditioner (i.e., a fertilizer whose main function is that of correcting the constitutional deficiencies of an agricultural soil), whose pellets, though sufficiently strong to resist mechanical stresses so as to be handled without undergoing crumbling, are rapidly dissolved when in contact with soil moisture so that powder sulfur becomes available in a short time.

As is well known, sulfur is supplied to soil with the main object of correcting alkalinity of the same and of intervening in the sodium-calcium ionic exchange. In agricultural soils, elements like nitrogen, phosphorus or potassium are to be supplied to soil in amounts of the order of tons or of quintals per hectare (macroelements) according to the kind of cultivation, while other elements like copper, zinc, manganese, iron etc. (microelements) are required in amounts just of the order of grams or kg per hectare; as a fertilizer, sulfur is considered to be a mesoelement, which is to be supplied in some hundred kg per hectare according to the kind of cultivation; on the contrary, as a corrective-acidifying agent, sulfur is a macroelement, to be administered in amounts of tons per hectare according to the alkalinity of the soil or to the presence of sodium.

Once sulfur is present in soil in finely divided form, it is converted into sulfate ions by sulfoxidizing microorganisms, like the bacteria of the kind Thiobacillus.

Not much care has been taken in general up to the present time of introducing sulfur directly into the soil, as the sulfur requirement was already satisfied by sulfate-containing fertilizers, as well as by acid rains and by the employment of natural organic manures with high contents of such element.

With the decrease in the employment of such manures and the lowering the concentration of sulfuric acid in acid rains, the need for making up for lack of sulfur is increased in the recent times.

It is quite evident that the best form for a rapid availability of the sulfur to bacterial attack, owing to its water insolubility, is the powder form; more particularly it has been set forth that the average granulometry should be lower than 80 mesh.

However, powdered sulfur cannot be easily distributed over soils because it gets easily dispersed into the air and it is irritant, so that it gives rise to inconvenience and troubles to workmen, especially as regards the eyes.

In DE-A-2 601 677 and DE-B-1 592 609 there are described sulfur containing fertilizers in granular form which are obtained mixing sulfur in finely divided form with binders to form an aqueous suspension which, then is dried and formed into granules.

In DE-B-1 024 934, GB-A-499 807, U.S. Pat. No. 1 795 364 e U.S. Pat. No. 4 062 694 it is described that sulfur in powder is transferred into dispersed sulfur compositions in the presence of auxiliary agents, including wetting agents.

In DE-B-1 024 934, U.S. Pat. No. 1 795 364 and U.S. Pat. No. 4 062 694 it is further described to make sulfur suspensions in the presence of common binders like clay.

Finally, in U.S. Pat. No. 3 062 637 it is disclosed to add clay in order to form clay bonded agricultural granules.

In order to obviate such drawbacks, some granular products have been prepared that can be easily distributed both by hand and by means of mechanical devices without dispersions into the air. In such products sulfur is mixed with bentonite clay by means of a hot process; the clay should make the granule disgregation easier when it is in contact with water, because it swells when exposed to moisture. Actually, such granules disgregate to a small extent essentially because of the fact that sulfur, which is insoluble and compact within the granule, "protects" the clay, so that the latter can contact water only after part of the sulfur has been removed from the granule due to the direct bacterial attack. It is evident that a compact pellet of some millimeters in diameter exposes a very limited surface to bacterial attack if compared to the same amount of sulfur powder or even sulfur in the form of a porous granule.

The drawback mentioned above stems mainly from the fact that the disclosed granular products are obtained through hot processes, starting from molten sulfur. The granule so obtained, even though it contains up to 10% of swelling clay, is hard and compact, and solidified sulfur prevents the same from being water-degraded. Accordingly, the products in question require long times for being assimilated by the soil.

Therefore, the object of the present invention is to provide a sulfur-based soil-corrective which is easy to handle just like the granular products already known, but which at the same time can also rapidly disgregate in soil water, so that the sulfur can expose a much larger surface to the aggressive attack of soil microorganisms.

In carrying out the above object and other objects of the invention, the sulfur-based soil-corrective utilizes micronized sulfur, having a particle diameter of less than 100 microns, that is separated from gross sulfur with an inert gas and is commercially referred to as a fly sulfur powder. This free flowing powder form ventilated sulfur contains up to 5% of inert material intended to secure fluidity.

The fly sulfur powder is mixed with at least 3% by weight of an inert product selected from the group consisting of clay, bentonite, kaolin, and mixtures thereof and at least 0.5% by weight of a wetting agent. Water is added in amounts about equal to the weight of the inert product plus the wetting agent to make a paste that is subjected to wet extrusion and dried to obtain pellets.

The advantageous performance of the product according to the present invention is due both to the presence of additional ingredients in said mix and to the particular wet-process employed for preparing such product starting from sulfur powder, which process does not involve the melting and the subsequent solidification of the sulfur particles.

The clay, which can be partially or totally substituted with bentonite and/or kaolin, performs the function of a binding agent in the mix and, in the finished product, it performs the well known function of swelling once it is in contact with water, so as to be of aid in causing the pellet to be disgregated. In the mix together with sulfur, the wetting agent and water clay also performs the functions of a lubricating agent for extrusion, as it makes the mix much more easy to process.

Moreover, when the pellets so obtained are dried, the mixture as a whole does not shrink, but clay by liberating water, contributes to the creation of a network of pores throughout the granule, said pores making the penetration of water and the consequent disgregation of the granule remarkably easier.

The wetting/dispersing agent clearly performs the function of allowing the water-repellent sulfur powder to be wetted and, additionally, it acts as an adhesive in the mix once the same has been dried, so preventing it from flaking off.

Accordingly, the present invention specifically provides a sulfur-based soil-corrective for agricultural use in the form of pellets, which product contains fly sulfur powder, at least 3% by weight of an inert product selected from the group consisting of clay, bentonite, kaolin and mixtures thereof, and at least 0.5% by weight of a wetting agent, the components being mixed with each other and being subjected to wet extrusion and subsequent drying to obtain said pellets.

The wetting agent is preferably selected from among lignin sulfonates or residual sugar products like distillation residues or slops; otherwise such agent can be any suitable solid or liquid surface active agent, or a mixture of two or more of the agents mentioned above.

A preferred embodiment of the product according to the present invention is that containing about 93% by weight of fly sulfur powder, 5% by weight of clay and 2% by weight of lignin sulfonate. Preferably, the fly sulfur powder is double refined and its fineness on dry basis is 92/95% passing through about 325 mesh (45 microns) ASTM. The percentage of moisture content in the fly sulfur powder should not exceed about 0.5%.

Moreover, other inorganic compounds can also be added to the mixture, such as for instance gypsum, magnesium sulfate or potassium sulfate. In that case, as a portion of sulfur is already present in the form of the sulfate ion, it is possible to lower the contents of elemental sulfur. Moreover, gypsum has the further advantage of containing the calcium ion for the Ca-Na ionic exchange in soil.

Other fertilizers in the form of powders can also be added to the mixture of the present invention, so as to complete the composition of the same. More particularly, compounds containing macro and/or meso and/or microelements can be added, or other organic manures or amending products and/or wastes from agricultural-food industries can be added, such as exhausted husks, exhausted grape skins, citrus fruit peels, tomato skins, by-products of the distillation industries, and so on.

The addition of microelements like copper, zinc, manganese, magnesium, iron, boron, molybdenum, etc. to the product of the present invention is also particularly useful, said product acting as a vehicle for such elements, so that their separate distribution in soil in the minimum amounts required is avoided.

The addition of phosphorus-based compounds can also be of particular advantage, as the presence of sulfur favors the dissolution of insoluble phosphorus, so making easier the absorption of such element by the plants.

According to a specific procedure for preparing the corrective product of the present invention, the components in the form of powders are mixed with one another, or better they are crushed and milled together in order to favor the homogenization of the mix. Then water is added in amounts about equal to the weight of clay plus the wetting agent(s) that are being employed, and the mix is fed to a die drawplate by means of rollers or by a screw feeder, which also causes further mixing of the paste, thus making the same more homogeneous. After extrusion, the product is passed through an air stream, so that it dries, thus giving the desired pellets. It has been found that with the addition of a greater amount of water, that the pellets lose their mechanical properties and cannot sustain the transfer toward the drying equipment. If the amount of water is less than specified, the extrusion duct is obstructed or the pellets present an outer water-proof film.

Alternatively, hemihydrate calcium sulfate or anhydrous magnesium sulfate can be employed in the mix mentioned above as drying agents. The first one of said compounds, in addition to act as a fertilizer, also has the property of absorbing one part of water per five parts of the material, while the second one can absorb one part of water per about one part of material.

As already mentioned above, the pellets are solid and strong, and they do not crumble or become crushed during handling, but their microscopic structure is highly porous, and as soon as they are in contact with the soil moisture they are rapidly disgregated so liberating sulfur powder, so that sulfur becomes quickly available for bacterial attack and for its transformation into the sulfate ion.

This invention has been disclosed with specific reference to some preferred embodiments thereof, but it is to be understood that modifications and/or changes can be introduced by those who are skilled in the art.

What is claimed is:

1. A sulfur-based fertilizer product in the form of pellets for alkalinity correcting application to agricultural soils and having a network of pores that assist water penetration and consequent breakdown of the pellets after application, said pellets being formed of constituents consisting essentially of fly sulfur powder combined with between 3% and 5% by weight of an inert product selected from the group consisting of clay, bentonite, kaolin and mixtures thereof, between 0.5% and 2% by weight of a powdered wetting agent, and between 0% and 3.5% by weight of other constituents, said constituents being mixed with one another, made into a paste by adding water in amounts about equal to the weight of the inert product plus the wetting agent, and subjected to wet extrusion and subsequent drying to obtain said pellets.

2. A product according to claim 1 wherein said wetting agent is selected from the group consisting of sugar compounds, distillation residues, and surface active agents.

3. A product according to claim 1 wherein said wetting agent is a lignin sulfonate.

4. A product according to claim 1 wherein said other constituents include, at least one of the substances gypsum, potassium sulfate and magnesium sulfate.

5. A product according to claim 1 wherein said other constituents include at least one soil conditioning microelement selected from the group consisting of copper, zinc, manganese, magnesium, iron, boron and molybdenum.

6. A product according to claim 1 wherein said other constituents include at least one organic fertilizer constituent selected from the group consisting of manures and agricultural food industry wastes.

7. A sulfur-based fertilizer product in the form of pellets for alkalinity correcting application to agricultural soils and having a network of pores that assist water penetration and consequent breakdown of the pellets after application, said pellets being formed by the process of:

mixing together constituents consisting essentially of fly sulfur powder, between 3% and 5% by weight of an inert product selected from the group consisting of clay, bentonite, kaolin and mixtures thereof, between 0.5% and 2% by weight of a powdered wetting agent, and between 0% and 3.5% by weight of other constituents;

forming a paste by adding water in amounts about equal to the weight of the inert product plus the wetting agent;

wet extruding the paste; and drying the extruded paste to obtain said pellets.

8. A product according to claim 7 wherein said wetting agent is selected from the group consisting of sugar compounds, distillation residues, and surface active agents.

9. A product according to claim 7 wherein said wetting agent is a lignin sulfonate.

10. A product according to claim 7 wherein said other constituents include at least one of the substances gypsum, potassium sulfate and magnesium sulfate.

11. A product according to claim 7 wherein said other constituents include at least one soil conditioning microelement selected from the group consisting of copper, zinc, manganese, magnesium, iron, boron and molybdenum.

12. A product according to claim 7 wherein said other constituents include at least one organic fertilizer constituent selected from the group consisting of manures and agricultural food industry wastes.

13. A product according to claim 7, said pellets being formed of constituents consisting of 93% by weight of fly sulfur powder combined with between 3% and 5% by weight of clay, 2% by weight of lignin sulfonate and between 0% and 2% of said other constituents.

14. A product according to claim 13 wherein said pellets have width and thickness dimensions of between 1 and 10 mm.

* * * * *